(12) United States Patent
Carazo

(10) Patent No.: US 7,611,105 B1
(45) Date of Patent: Nov. 3, 2009

(54) CORNER PRISM POLE AND STAND

(76) Inventor: Kenneth Carazo, 1009 Greentree Ave., Metairie, LA (US) 70001

(*) Notice: Subject to any disclaimer, the term of this patent is extended or adjusted under 35 U.S.C. 154(b) by 351 days.

(21) Appl. No.: 11/617,490

(22) Filed: Dec. 28, 2006

Related U.S. Application Data

(66) Substitute for application No. 60/771,822, filed on Feb. 8, 2006.

(51) Int. Cl.
*F16M 11/04* (2006.01)

(52) U.S. Cl. ............... 248/187.1; 248/186.2; 33/293; 33/286

(58) Field of Classification Search ............ 248/176.1, 248/177.1, 186.2, 187.1, 183.3, 220.1; 33/293, 33/286, 289, 227, 228; 702/151
See application file for complete search history.

(56) References Cited

U.S. PATENT DOCUMENTS

| | | | |
|---|---|---|---|
| 3,057,250 A | 10/1962 | Griffith | |
| 3,736,058 A * | 5/1973 | Iadarola | 356/4.08 |
| 4,135,823 A | 1/1979 | Hörvallius | |
| 4,192,076 A * | 3/1980 | Hall | 33/296 |
| 4,803,784 A | 2/1989 | Miller | |
| 5,040,759 A * | 8/1991 | Wainwright | 248/186.2 |
| 5,701,679 A * | 12/1997 | Buzikievich | 33/293 |
| 5,749,549 A * | 5/1998 | Ashjaee | 248/168 |
| 5,760,748 A | 6/1998 | Beckingham | |
| 6,425,186 B1 * | 7/2002 | Oliver | 33/293 |
| 6,834,839 B1 | 12/2004 | Wilson | |
| 2003/0079356 A1 | 5/2003 | Crain et al. | |

* cited by examiner

*Primary Examiner*—A. Joseph Wujciak, III
(74) *Attorney, Agent, or Firm*—Garvey, Smith, Nehrbass & North, L.L.C.; Brett A. North

(57) ABSTRACT

In one embodiment is provided is an adjustable prism corner stand which can be adjusted relative to the position of a distance measuring device. In one embodiment the present invention allows a corner to be accurately shot by placing the prism on a bar having a ninety degree angle which fits over the outside corner being shot or the inside corner being shot.

6 Claims, 12 Drawing Sheets

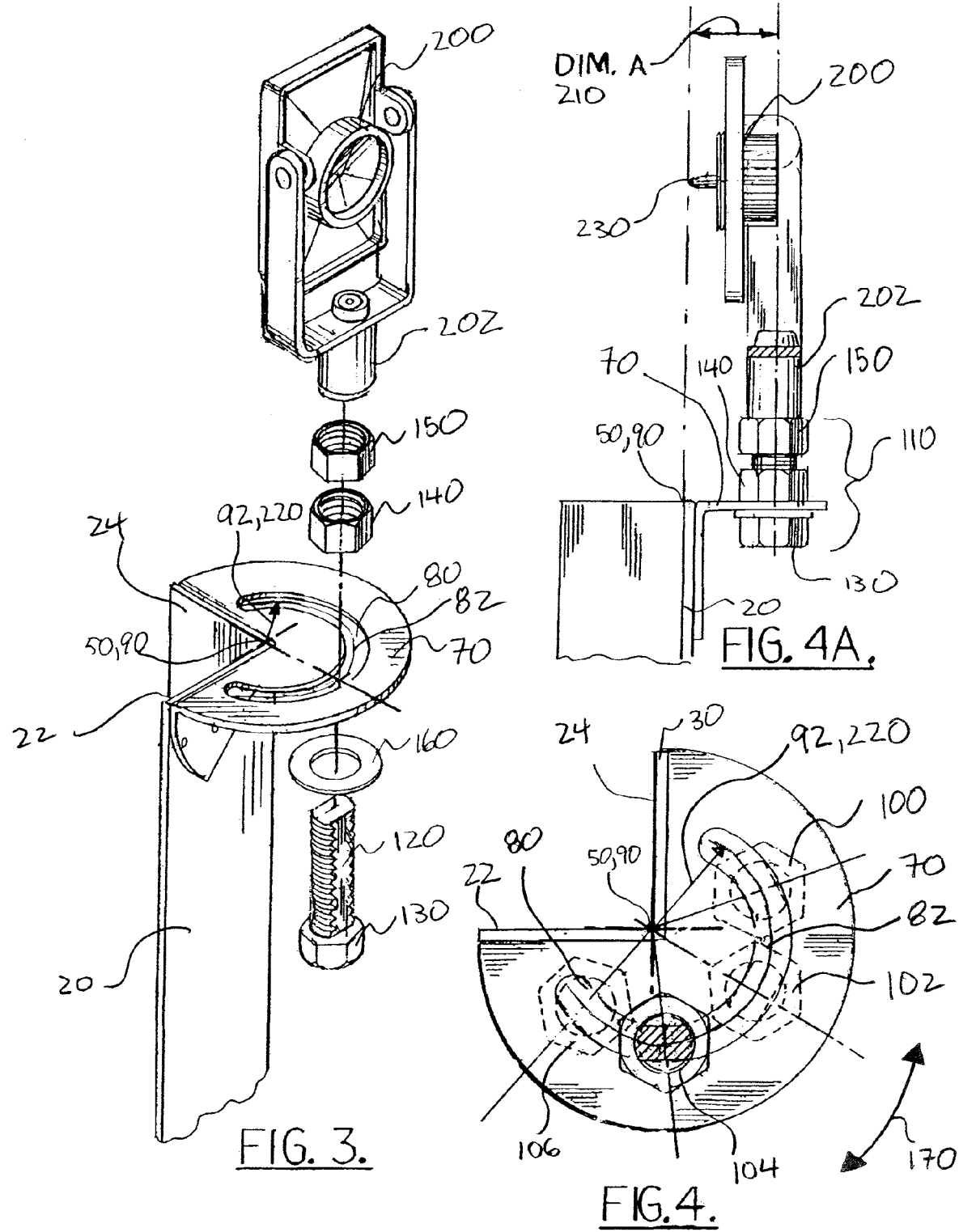

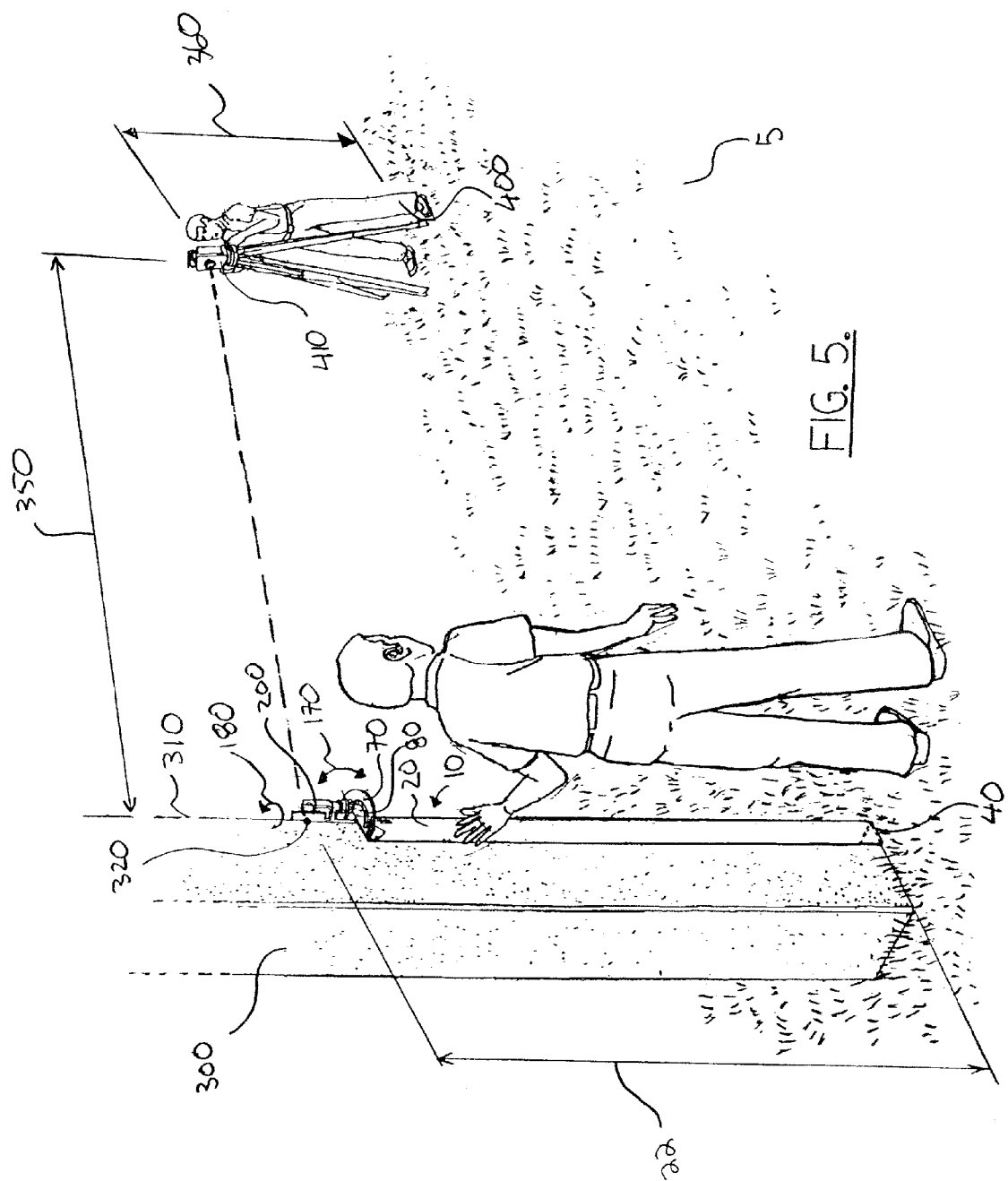

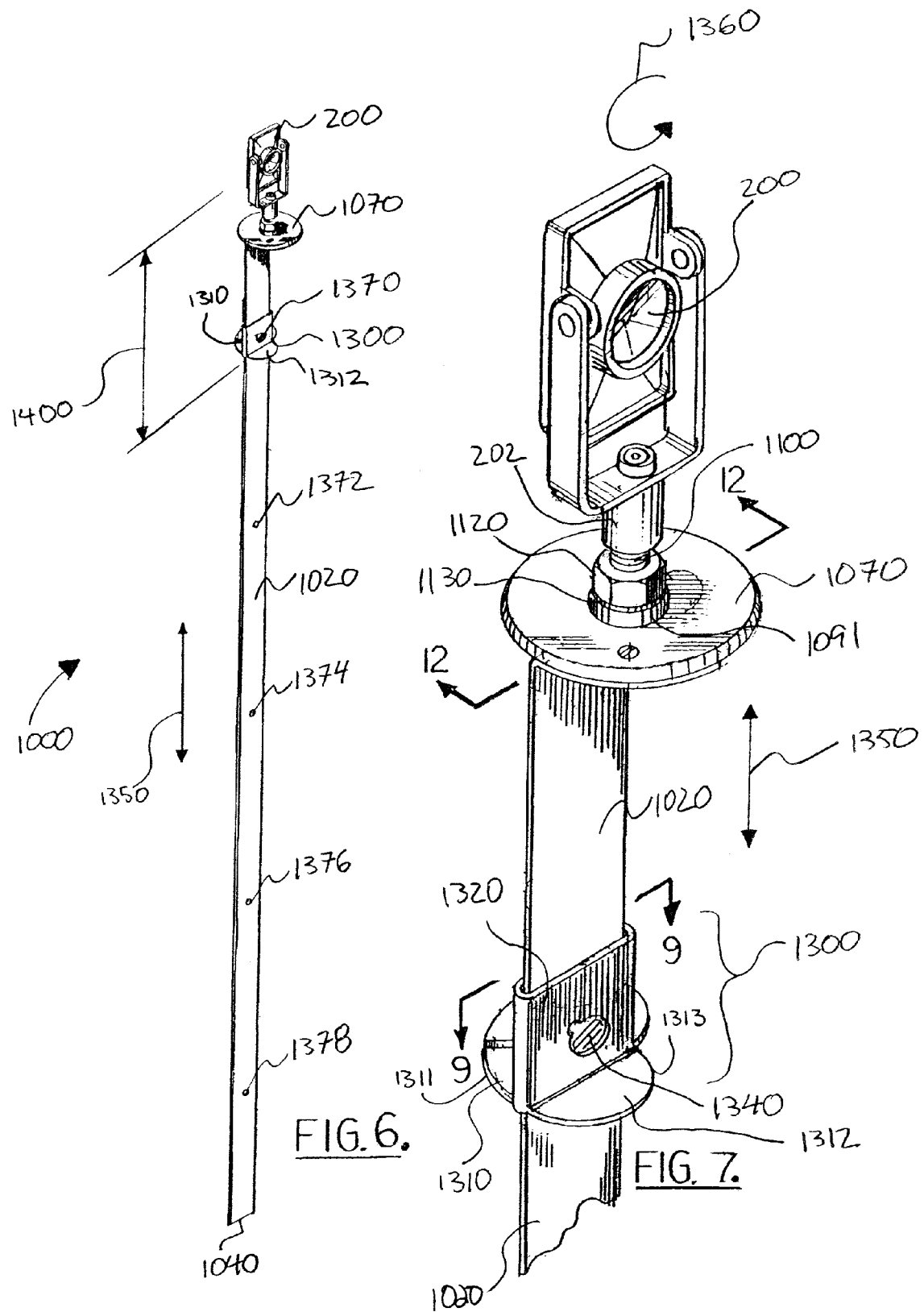

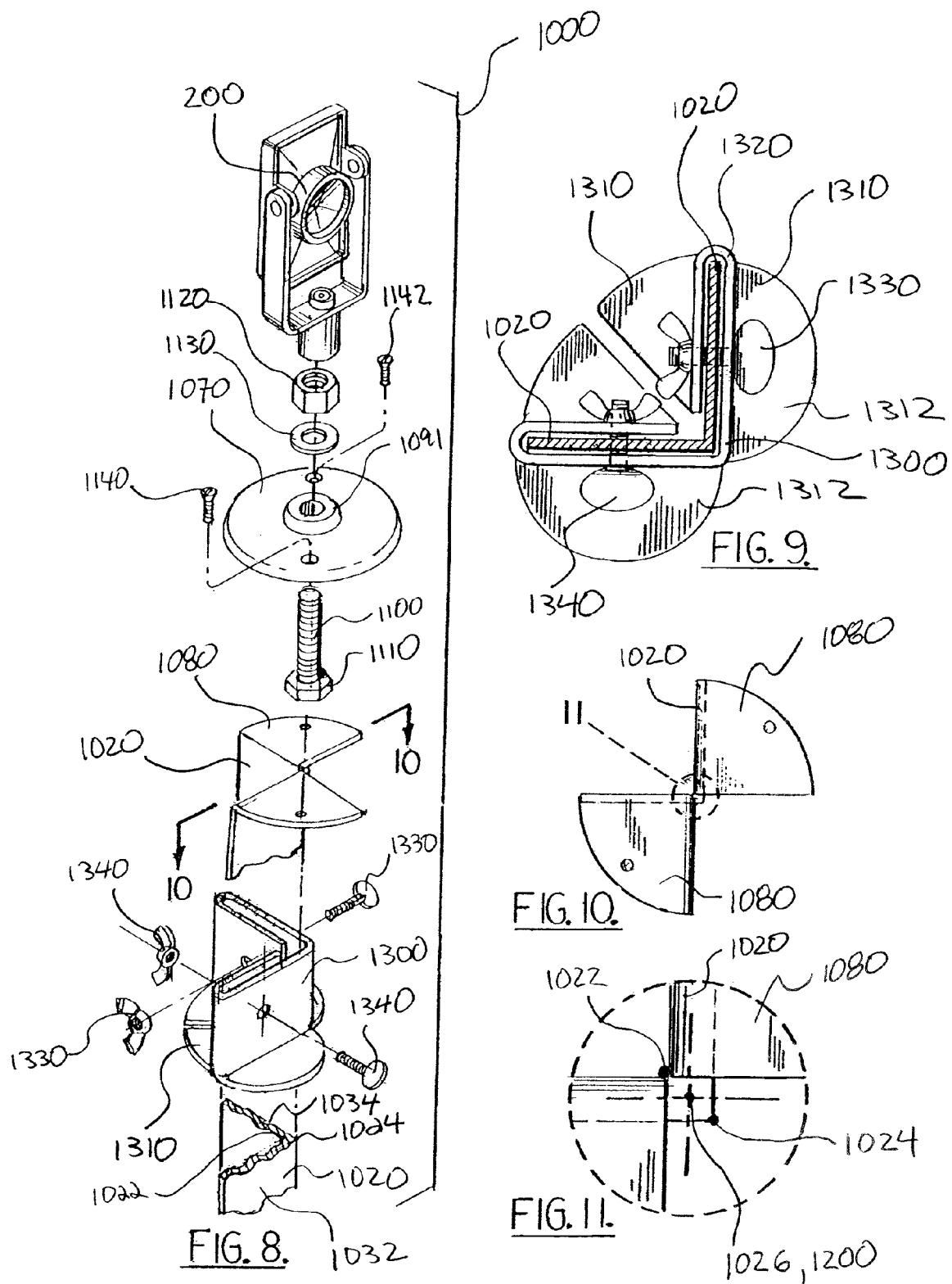

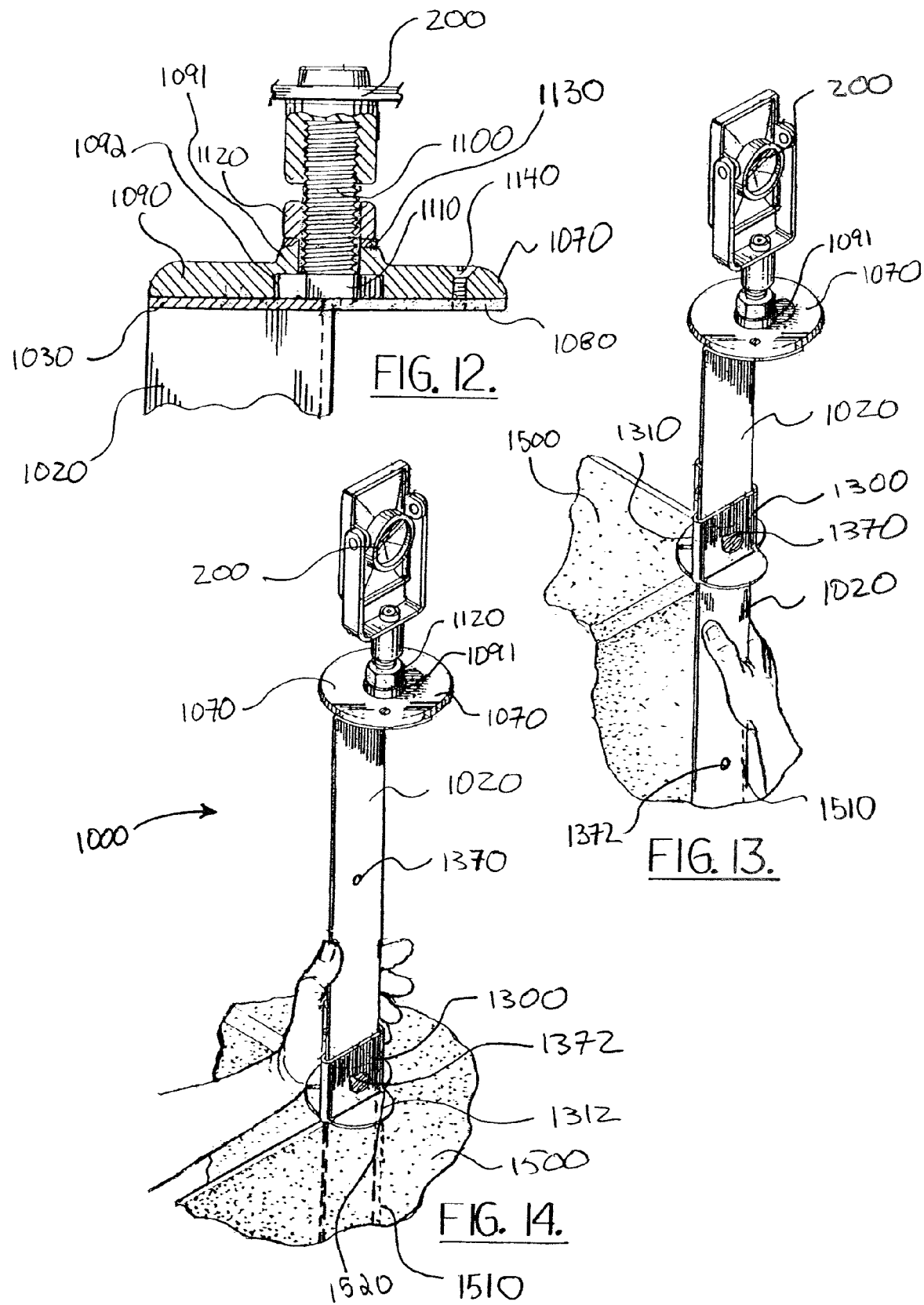

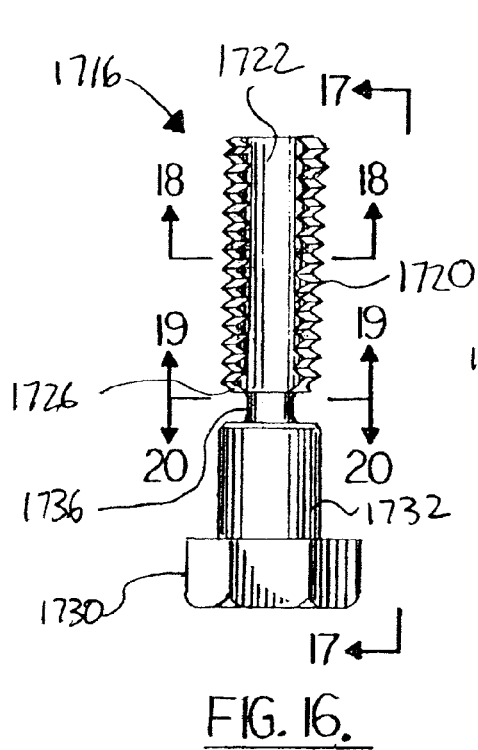
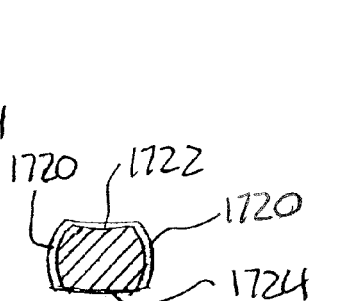
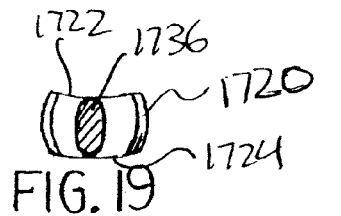
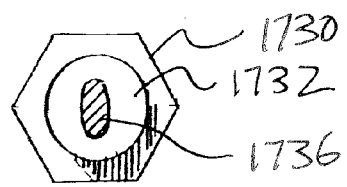
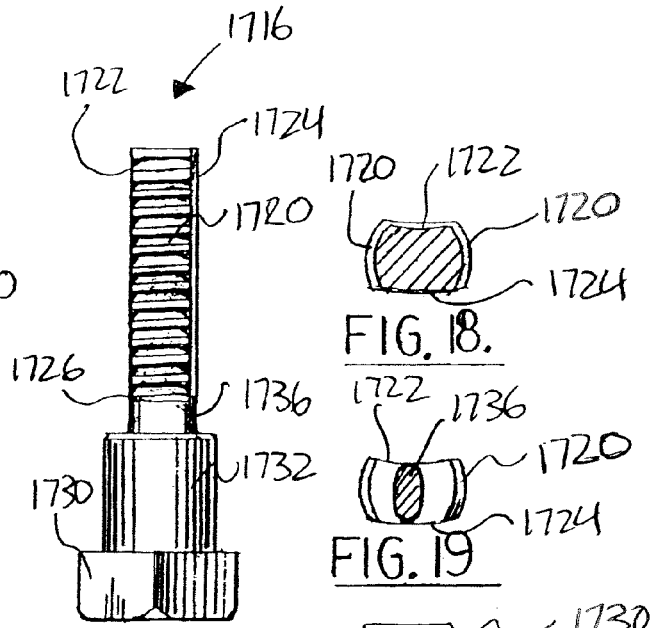
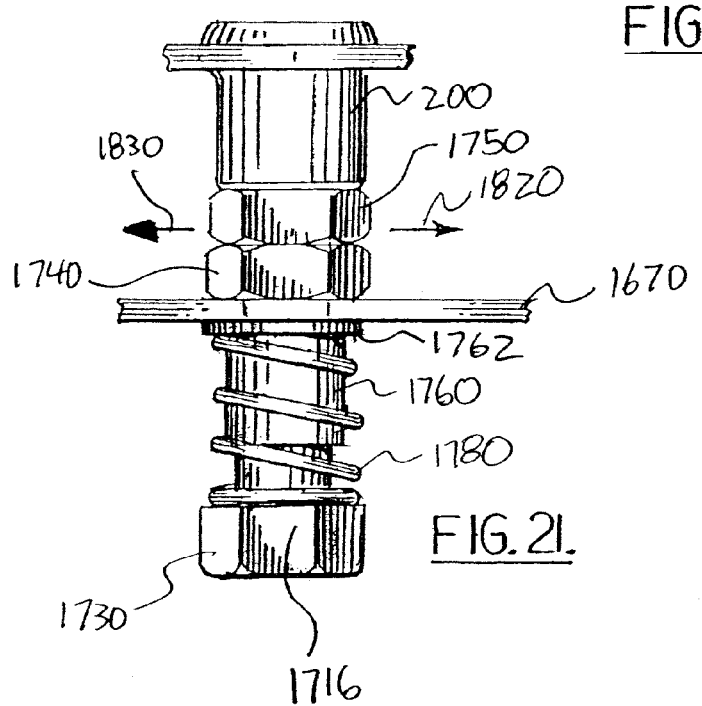

CORNER PRISM POLE AND STAND

CROSS-REFERENCE TO RELATED APPLICATIONS

U.S. Provisional Patent Application Ser. No. 60/771,822, filed Feb. 8, 2006 is incorporated herein by reference.

Priority of U.S. Provisional Patent Application Ser. No. 60/771,822, filed Feb. 8, 2006, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND

This invention relates generally to surveying equipment. Surveying equipment and particularly the support structure should be able to withstand all kinds of environmental conditions while retaining its integrity and dimensional accuracy. In many instances, the dimensional accuracy is imperative in order to obtain the correct measurements in a geographic survey. For instance, prism poles and global positioning satellite (GPS) poles should be able to retain a substantially fixed position of extension as they are moved from place to place over uneven terrain and in all kinds of weather.

Prior art prism poles generally include two or more interfitting pole sections, and support a prism or other measurement device at the top used to sight or determine positions with laser, modulated infrared, angular and/or GPS position locators or like surveying systems. The prism reflects light back to the position locator for determining the location of the prism at different locations in a survey. U.S. Pat. No. 5,255,441 explains the operation of a basic prism pole.

One of the disadvantages with poles is that they are problematic when taking measurements of objects at corners, especially corners which have been chamferred (or beveled). With round poles the surveyor must manually position the pole at the point where he believes the corner actually exists. Such an estimate causes inaccuracies in the measurement where the pole is not accurately located.

Another disadvantage with poles is that they add inaccuracies where the surveying shot is taken at an angle of forty five degrees between the two planes forming the corner. Where this occurs the surveyor must compensate for an "odd" angle shot (i.e., one not at exactly forty five degrees).

There is a need in the art for providing improved prism stands.

The following US Patents are incorporated herein by reference: U.S. Pat. No. 5,255,441.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in anyway from the spirit of the present invention. No feature of the invention is critical or essential unless it is expressly stated as being "critical" or "essential."

BRIEF SUMMARY

The apparatus of the present invention solves the problems confronted in the art in a simple and straightforward manner. What is provided is an adjustable prism corner stand which can be adjusted relative to the position of a distance measuring device.

In one embodiment is provided a prism stand allowing a corner to be accurately shot by placing the prism on a bar having substantially a ninety degree angle which fits over the corner being shot or inside the corner being shot.

In one embodiment is provided a prism stand wherein the prism can be adjusted both translationally and rotationally to be positioned relative to a spaced apart measuring device.

In one embodiment is provided a prism stand wherein the prism can be adjusted translationally to be positioned relative to a spaced apart measuring device.

In one embodiment is provided a prism stand wherein the prism can be adjusted both vertically and rotationally to be positioned relative to a spaced apart measuring device.

In one embodiment is provided a prism stand wherein the prism can be adjusted vertically to be positioned relative to a spaced apart measuring device.

In one embodiment is provided a prism stand wherein the prism can be adjusted rotationally to be positioned relative to a spaced apart measuring device.

In one embodiment is provided a prism stand wherein the prism can be slidably adjusted relative vertically to the base of the stand.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is an exploded perspective view of the prism corner stand of FIG. 1;

FIG. 4 is a top view of the prism corner stand of FIG. 1 illustrating multiple positions of the prism on the prism support;

FIG. 4A is a side view of FIG. 4 illustrating Dimension A for correcting the offset from the center of the pole;

FIG. 5 is a perspective view showing a surveying shot being taken using the prism corner stand of FIG. 1;

FIG. 6 is a perspective view of an alternative embodiment of a prism corner stand;

FIG. 7 is a close-up perspective view of the prism corner stand of FIG. 6;

FIG. 8 is an exploded view of the adjustable stand of FIG. 6;

FIG. 9 is a sectional view of the prism corner stand of FIG. 7 taken along the lines 9-9;

FIG. 10 is a is a sectional view of the prism corner stand of FIG. 8 taken along the lines 10-10;

FIG. 11 is an enlarged view of the area 11 from FIG. 10;

FIG. 12 is a sectional view of the prism corner stand of FIG. 7 taken along the lines 12-12;

FIG. 13 is a perspective view showing the prism corner stand of FIG. 6 being placed on an outside corner of a building slab or a column top;

FIG. 14 is a perspective view showing the prism corner stand of FIG. 6 being placed on an inside corner of a building slab or a column top;

FIG. 16 is a front view of a threaded bolt which can be used in one embodiment;

FIG. 17 is a side view of the bolt of FIG. 16;

FIG. 18 is a sectional view of the bolt of FIG. 16 taken along the lines 18-18

FIG. 19 is a sectional view of the bolt of FIG. 16 taken along the lines 19-19;

FIG. 20 is a sectional view of the bolt of FIG. 16 taken along the lines 20-20;

FIG. 21 is an assembled view of a quick release/quick lock frictional positioning system;

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figures 1, 2:
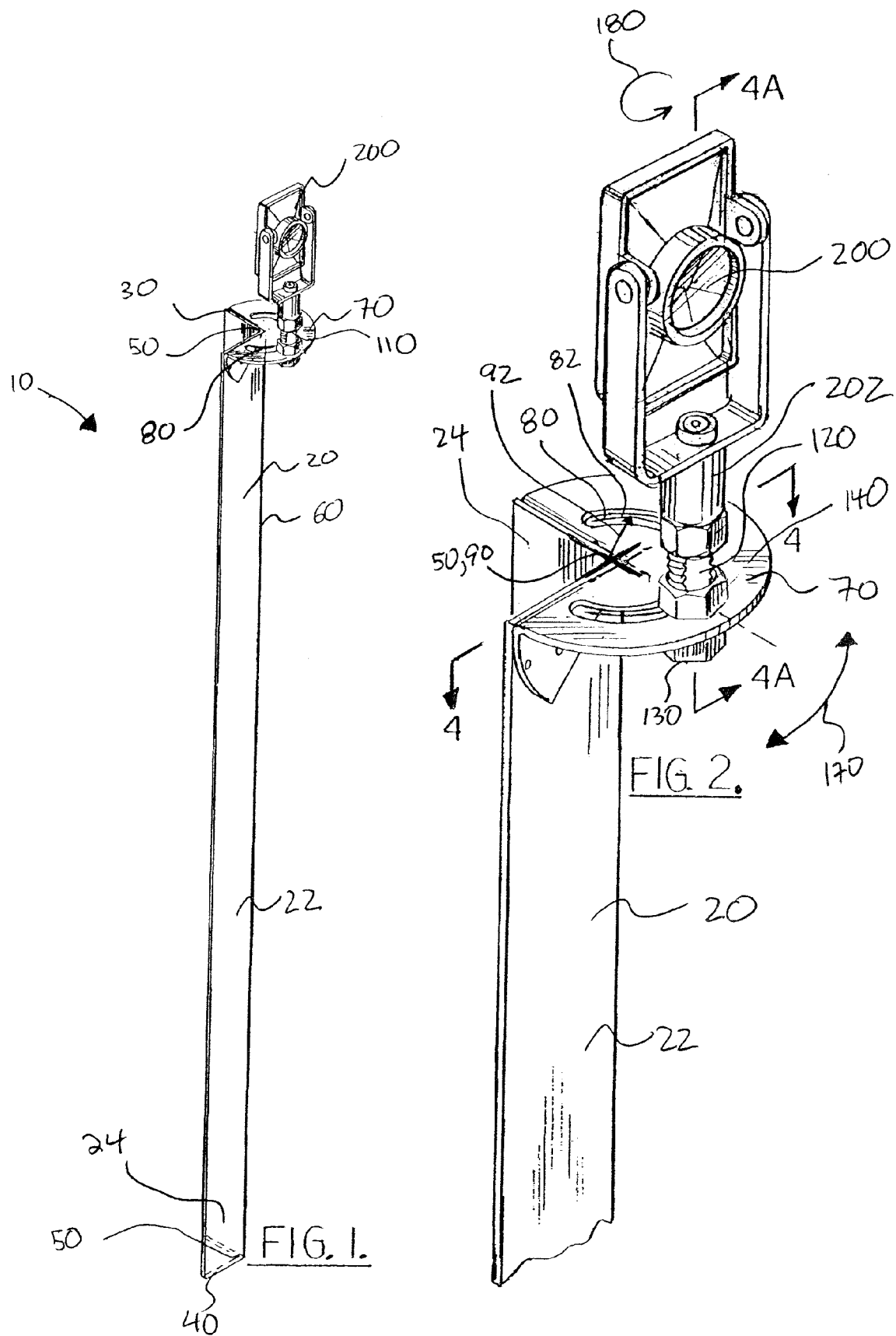
FIG. 1 is a perspective view of a preferred embodiment of an adjustable prism corner stand.
FIG. 2 is a close-up perspective view of the prism corner stand of FIG. 1.

In a first embodiment prism corner stand 10 allows for both translational and rotational adjustment. FIG. 1 is a perspective view of a preferred embodiment of adjustable prism corner stand 10. FIG. 2 is a close-up perspective view of prism corner stand 10. FIG. 3 is an exploded perspective view of prism corner stand 10. FIG. 4 is a top view of prism corner 10 illustrating multiple positions of prism 200 on prism support 70. FIG. 4A is a side view of FIG. 4.

FIG. 5 is a perspective view showing a surveying shot being taken using prism corner stand 10 with prism 200. In this surveying shot, prism corner stand 10 has been placed on the corner of building 300 at a point below the top of building 300 for measuring outside corner point 320 of outside corner 310 (although outside corner 310 might be a theoretical corner as the corner may be beveled such as by a forty five degree bevel). A surveying shot can be taken by surveyor 400 using electronic distance measuring device 410, which measuring device has been placed on ground 5 at a position spaced apart from corner point 320. For making an accurate surveying shot, prism 200 can be moved about or positioned on support 70 via slot 80 to a position directly in between the corner and the location where the shot is being taken (to directly face the line of site of electronic measuring device 410 as indicated by the dashed line from device 410 to prism 200). When directly in between the position to be measured (corner point 320) and the electronic distance measuring device 410, prism 200 can be turned perpendicular to the beam making the shot. When this is done a true measurement of the position of corner point 320 can be had by merely adjusting for the distance of prism 200 to the edge of the corner (which correction remains constant no matter what position prism 200 is in slot 80) and the correction is based on the radius of curvature for slot 80 (as explained below). Preferably, the radius of curvature will equal the distance from the center 82 of slot 80 to the edge of the corner of building 300 (i.e., corner point 320). In FIG. 5 translative selective positioning of prism 200 is schematically indicated by arrows 170. Rotative positioning is schematically indicated by arrow 180. The distance 350 from outside corner point 320 to electronic measuring device 410 can be measured. The height 22 from prism 200 to ground 5 is a known quantity. The height 360 from electronic measuring device 410 to ground 5 is known. From these items a location of outside corner point 320 can be determined for surveying purposes.

In the above embodiment, prism 200 has two degrees of freedom—(a) rotation about prism support 70 and (b) translational movement through semicircular slot 80.

The individual components of prism corner stand 10 will now be described. Prism corner stand 10 can comprise angle 20, prism support 70, and adjustment means 110. Angle 20 can comprise side 22, side 24, top 30, bottom 40, inside corner 50, and outside corner 60. Prism support 70 and adjustment means 110 can be used to selective adjust both the position and vertical rotation of prism 200.

Prism support 70 can be attached to angle 20 by any convenient means, such as fasteners, adhesives, magnets, welding, etc. Preferably prism support 70 is substantially perpendicular to both faces of angle 20. As best shown in FIGS. 2-4, prism support 70 can include semicircular radial slot 80, which has a radius of curvature 92, measured from inside corner 50 of angle 20 to the center 82 of slot 80. In this manner regardless of the translational position of prism 200 on slot 80 (as schematically indicated by arrows 170), prism 200 will be a fixed distance from inside corner 50. FIG. 4 shows various translational positions 100,102,104,106 of around slot 80. Prism 200 can also be rotatively adjusted relative to support 70 as indicated by arrow 180 in FIG. 2. These translational and rotational adjustments can be accomplished through adjustment means 110.

As shown in FIGS. 2-4, adjustment means 110 can comprise threaded stem 120, head 130, nut 140, nut 150, and washer 160. Nut 140 can be used to frictionally lock stem 120 at a specific translational location in slot 80, such as by tightening nut 140 at a selected location. When nut 140 is loosened stem 120 can also be rotated as indicated by arrow 180. Because prism 200 can also be mounted on stem 120 prism 200 can also be positioned (both translationally and rotationally) with stem 120. Nut 150 can serve as a lock nut which frictionally engages base 202 of prism 200.

As shown best in FIG. 4A slot 80 is made so that pointer 230 of prism 200 will line up with inside corner 50 of angle 20 of stand 10 (and have its center of rotation 90 for slot 80 at this point). In this way, regardless of the position in slot 80, prism 200 will provide a measurement from inside corner 50 which is placed in contact with outside corner point 320 of building 300 to be measured and provide an accurate measurement without correction for the thickness of angle 20. However, if a measurement of an inside corner of a building is to be taken, then a correction for the thickness of angle 20 can be made. Alternatively, the center of rotation 90 for slot 80 can be made at some other point (e.g., (a) at the outside corner 60 of angle 20 or (b) at the midpoint between the outside corner 60 and inside corner 50 of angle 20) some distance X from the point to be measured as long as a correction for the some distance X is made.

In a another embodiment prism corner stand 1000 allows for adjustment in both vertical and rotational directions. FIG. 6 is a perspective view of prism corner stand 1000. FIG. 7 is a close-up perspective view of prism corner stand 1000. FIG. 8 is an exploded view of prism corner stand 1000. FIG. 9 is a sectional view of prism corner stand 1000 taken along the lines 9-9. FIG. 10 is a sectional view of prism corner stand 1000 taken along the lines 10-10. FIG. 11 is an enlarged view of the area 11 from FIG. 10. FIG. 12 is a sectional view of prism corner stand 1000 taken along the lines 12-12.

Prism corner stand 1000 can comprises angle 1020, prism support 1070, and adjustable mechanism 1300. Prism 200 can be attached to prism support 1070. Angle 1020 can be slidable relative to adjustable mechanism 1300. Prism 200 can be rotated relative to prism support 1070.

To provide adjustability in a vertical direction, a plurality of vertical adjustment positions (e.g., first position 1370, second position 1372, third position 1374, fourth position 1376, and fifth position 1378) can be provided at known spacing wherein adjustment mechanism can engage. Alternatively, adjustment mechanism can be constructed to engage at any position along a stretch of angle 1020 (such as by using one or more set screws or clamps) where a measuring system is provided to determine the relative position of adjustment mechanism 1300 to prism 200 tor to the bottom 1040 of angle 1020 (this measuring system could be a series of graduated markings similar to those found in rulers).

Adjustability in the vertical direction relative to the top of the corner being measured allows the height of prism 200 to be adjusted. Adjustment of the height may be necessary for a variety of means such as moving prism 200 away from an obstruction (e.g., bushes or trees) which would tend to block prism 200.

Adjustable means 1300 can also allow stand 1000 to be free standing. That is, gravity holds down stand 1000 and a second individual does not need to hold the stand while the surveying shot is being taken (as with regular poles). Adjustable mechanism 1300 allows corner stand 1000 to be placed on top of a corner and remain in place by gravity.

Rotational adjustability is also provided for in prism corner stand 1000. As best shown in FIGS. 6-8, and 12, prism 200 can be mounted on top of prism support 1070 which support allows the prism to be rotated (as schematically shown by arrow 1360) about a single point. Accordingly, prism 200 can be pointed in the direction of a person making the surveying shot. This single point of rotation is allowable as prism 200 is located above the corner being shot and can be positioned substantially next to the corner being shot (although some height above the corner). This is different from adjustable prism corner stand 10 where prism 200 is typically located below the top of the corner being shot and therefore must be spaced apart from the corner.

The individual components of adjustable corner prism stand 1000 will now be reviewed.

Prism corner stand 1000 can comprises angle 1020, prism support 1070, and adjustable mechanism 1300. Prism 200 can be attached to prism support 1070. Angle 1020 can be slidable relative to adjustable mechanism 1300. Prism 200 can be rotated relative to prism support 1070.

Angle 1020 (as best shown in FIGS. 6-8) can comprise first side 1032, second side 1034, top 1030, bottom 1040. Angle 1020 can also includes a plurality of vertical adjustment positions (e.g., first position 1370, second position 1372, third position 1374, fourth position 1376, and fifth position 1378) at known spacing wherein adjustment mechanism 1300 can engage. Angle 1020 can also include lower base 1080 which is connected to prism support 1070.

Prism support 1070 (best shown in FIGS. 8 and 12) can comprise upper base 1090 and enlarged area 1091. Enlarged area 1091 can include cavity 1092. Bolt 1100 can be installed through an opening in enlarged area 1091, such that its head 1110 can fit inside of cavity 1092. Cavity 1092 and head 1110 can be constructed such that bolt can rotate within cavity 1092. This can be accomplished by rounding out cavity 1092 or rounding out head 1110 such that these two will not interlock. Alternatively cavity can be made large enough that head 1110 can freely rotate inside cavity 1092. Bolt 1100 can be locked into cavity 1092 by nut 1120 (washer 1130 can also be placed between nut 1120 and the top of enlarged area 1091. Prism 200 can be threaded onto bolt 1100. To lock down prism 200 at a set rotational setting, nut 1120 can be tightened against the top of enlarged area 1091. Although not shown a locking nut can be used to lock prism 200 onto bolt 1100, which locking nut would engage base 202 of prism 200.

Adjustment mechanism 1300 (best shown in FIGS. 7-9) can comprise sleeve 1320, first base 1310, second base 1312, anchoring means 1330, and anchoring means 1340. Anchoring means 1330, 1340 can be various detachable fasteners such as wing nuts or set screws, or other fasteners which can detachably fasten.

As shown in FIGS. 10 and 11, the center of rotation 1200 or prism 200 on prism support 1070 is located at midpoint 1026, between inside corner 1022 and outside corner 1024 of angle 1020. The center of rotation 1200 of prism 200 would be the center of rotation of bolt 1100 with respect to prism support 1070. In this manner regardless of whether prism corner stand 1000 is used to measure an inside corner or outside corner of a building the same adjustment factor will be used to adjust for the distance measures—one half of the distance between inside corner 1022 and outside corner 1024. Accordingly, the user will not have to change the adjustment depending on what type of corner is measured. As with prism corner stand 10 the center of rotation 1200 of prism 200 can be located some other point in relation to inside corner 1022 and outside corner 1024, however, different adjustment factors would be used depending on whether an insider or outside corner is measured.

FIG. 13 is a perspective view showing prism corner stand 1000 being placed on an outside corner 1510 of building 1500. Here, stand 1000 is supported by bottom 1311 of base 1310. In this case adjustable mechanism 1300 is set in first adjustment position 1370 so that distance 1400 (shown in FIG. 6 as the distance between prism 200 and the bottom 1311 of base 1310) would have to be subtracted to obtain the true height of the outside corner 1510 being measured. This distance can be pre-programmed into distance measuring 410 device to be automatically subtracted.

FIG. 14 is a perspective view showing prism corner stand 1000 being placed on an inside corner 1520 of building 1500. Here, stand 1000 is supported by bottom 1313 of base 1312. In this case adjustable mechanism 1300 is set in second adjustment position 1372 so that distance 1400 (shown in FIG. 6 as the distance between prism 200 and the bottom 1313 of base 1312) along with the distance between first adjustment position 1370 and second adjustment position 1372 would both have to be subtracted to obtain the true height of the inside corner 1520 being measured. This distance can be pre-programmed into distance measuring 410 device to be automatically subtracted.

Figures 12A, 12B, 12C:
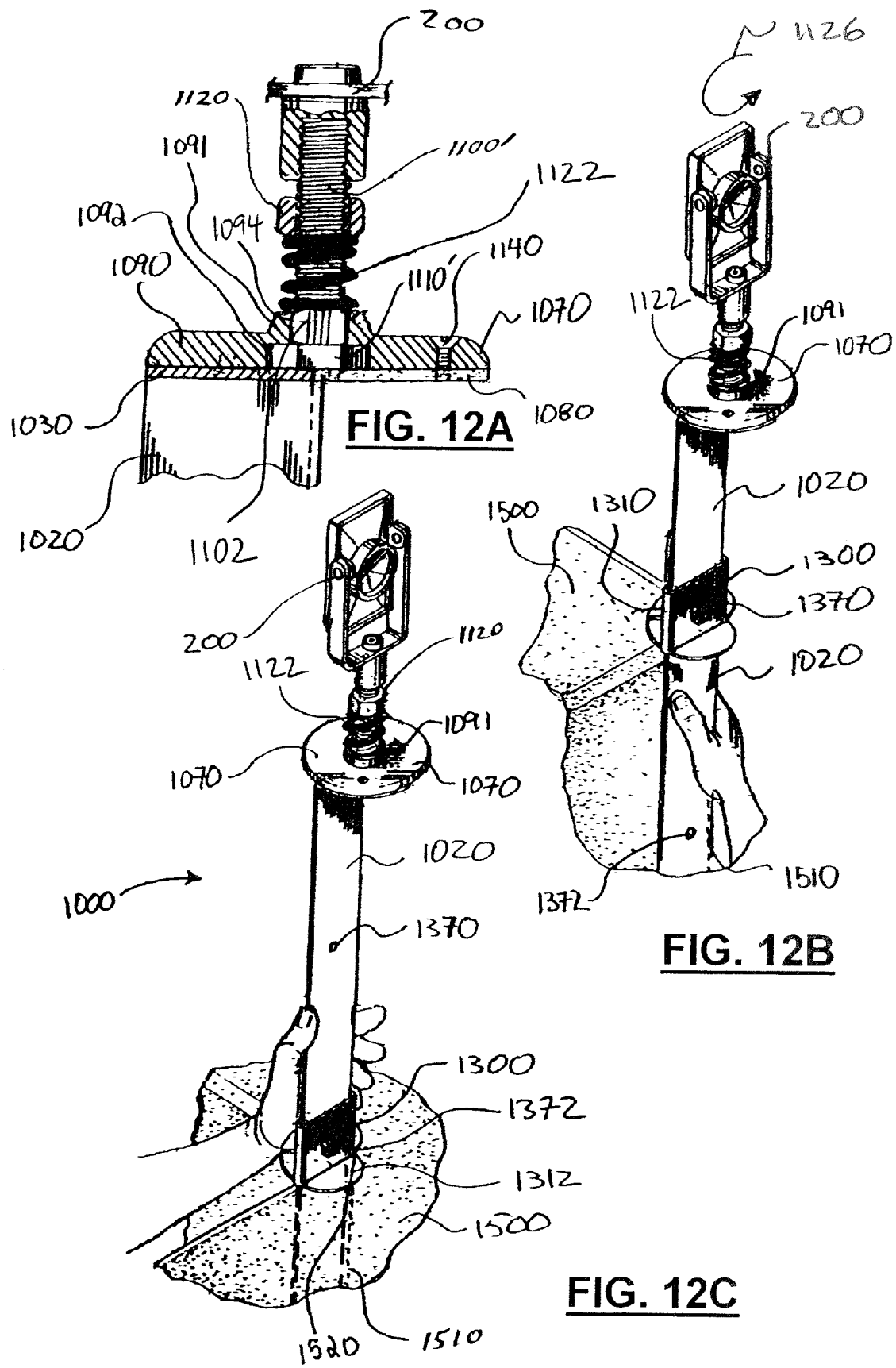
FIG. 12A is a partial sectional front view of an alternative threaded locking bolt and nut which can incorporate biasing member (which can be a spring, rubber boot, or other selected biasing material forming a quick release/quick locking system.
FIG. 12B is a perspective view showing the prism corner stand of FIG. 12A being placed on an outside corner of a building slab or a column top.
FIG. 12C is a perspective view showing the prism corner stand of FIG. 12A being placed on an inside corner of a building slab or a column top.
Figure 12D:
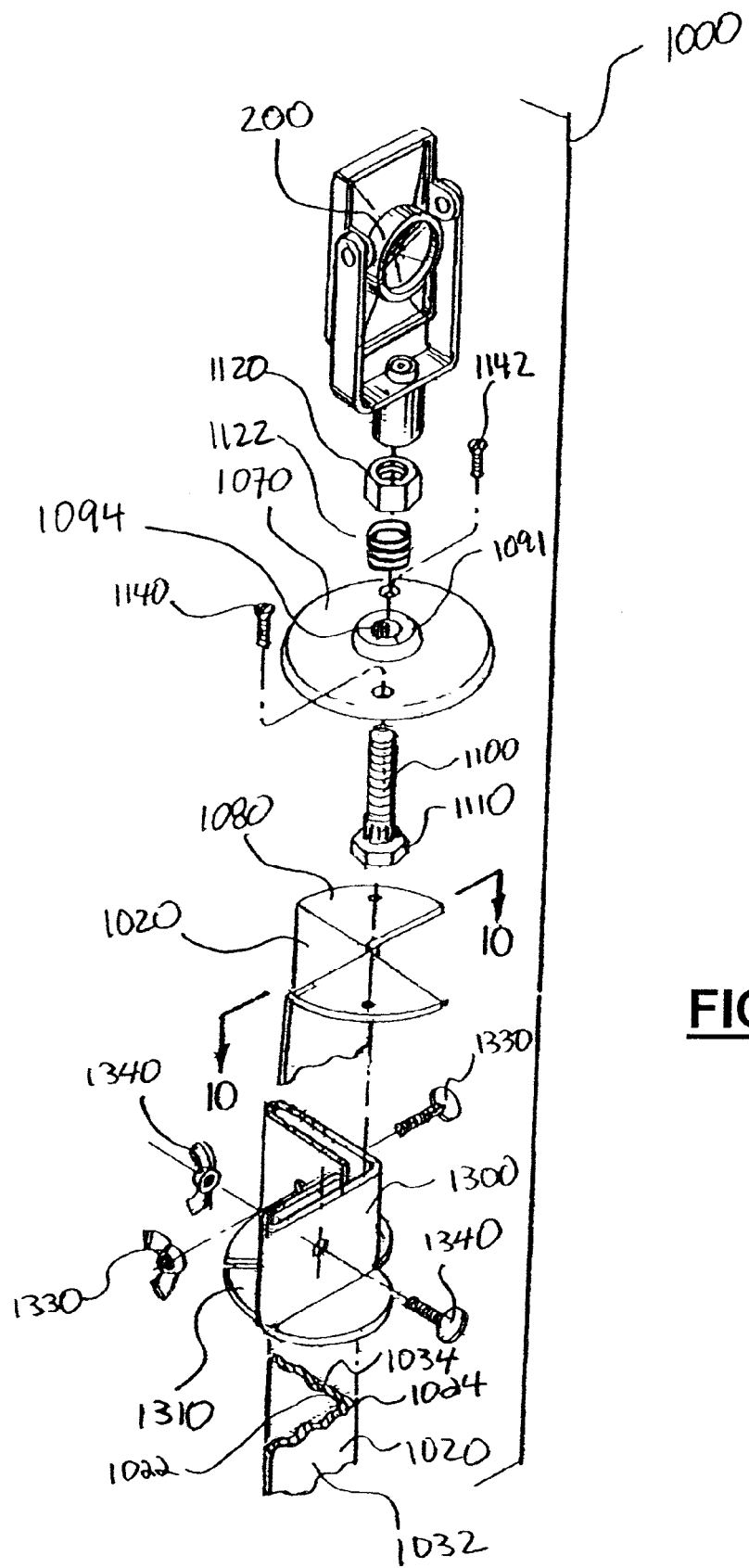
FIG. 12D is an exploded view of the adjustable stand and quick lock/quick release of FIG. 12A.

FIGS. 12A through 12D show an alternative quick locking/quick release means for rotationally adjusting prism 200 in a selected rotational position (which can use frictional forces to adjustably lock). FIG. 12A is a partial sectional front view of a threaded locking bolt 1100' and nut 1120 which can incorporate biasing member 1122 (which can be a spring, rubber boot, or other selected biasing material). FIG. 12B is a perspective view showing the prism corner stand of FIG. 12A being placed on an outside corner of a building slab or a column top (and schematically indicating rotational adjustment in the direction of arrow 1126). FIG. 12C is a perspective view showing the prism corner stand of FIG. 12A being placed on an inside corner of a building slab or a column top. FIG. 12D is an exploded view of the adjustable stand and quick lock/quick release adjustment means of FIG. 12A. In one embodiment, bolt 1100' can include enlarged area 1102 (or enlarged shank) which can be enlarged and provide additional vertical support to bolt 1100' (and also prism 200) through bore 1094 of upper base 1090 (and resist a tendency of bolt 1100' to move away from a vertical position) when compared to having threads all the way down to head 1110' of bolt 1100'. Biasing member 1122 and nut 1120 can be used to frictionally lock stem bolt 1100' (and thereby lock connected prism 200) at a specific rotational position relative to stand 1000. Tightening nut 1120 compresses biasing member 1122 which frictionally locks prism 200 to prism support 1070 between nut 1120 and enlarged area 1091. Frictional locking encompasses a lock in a selected position which may be overcome by addition of a rotational force, however, the item tends to remain in a selected rotational position unless and until an added rotational force is applied. In one embodiment one or more washers can be used on bolt 1100' between biasing member 1122 and prism support 1070 (these washers can also be locking washers). To move prism 200, prism 200 can be rotated in the direction of arrow 1126 causing stem 1100' to rotate in the direction of arrow 1126 and allowing prism 200 until the desired angular position is achieved. The compression of biasing member 1122 can be such that prism 200 can rotated in the direction of arrow 1126 (or in a direction opposite that of the direction of arrow 1126) without having to loosen nut 1120. Instead, this frictionally locking adjustable means can be moved in the direction of arrow 1126 (or opposite to arrow 1126) to a selected rotational position by applying added rotational forces. Nut 1120, bolt 1100', and prism 200 will rotate if the frictional forces between these members and support 1070 are overcome such as when an added external rotational force is applied in the direction of arrow 1126 (or opposite to arrow 1126) which overcomes the frictional locking force by frictional adjusting means. Once the added external rotational force is removed adjusting means will again lock in place. Using a rotational force prism 200 can be adjusted to a selected rotational position relative to support 1070 and stand 1000.

Figure 15:
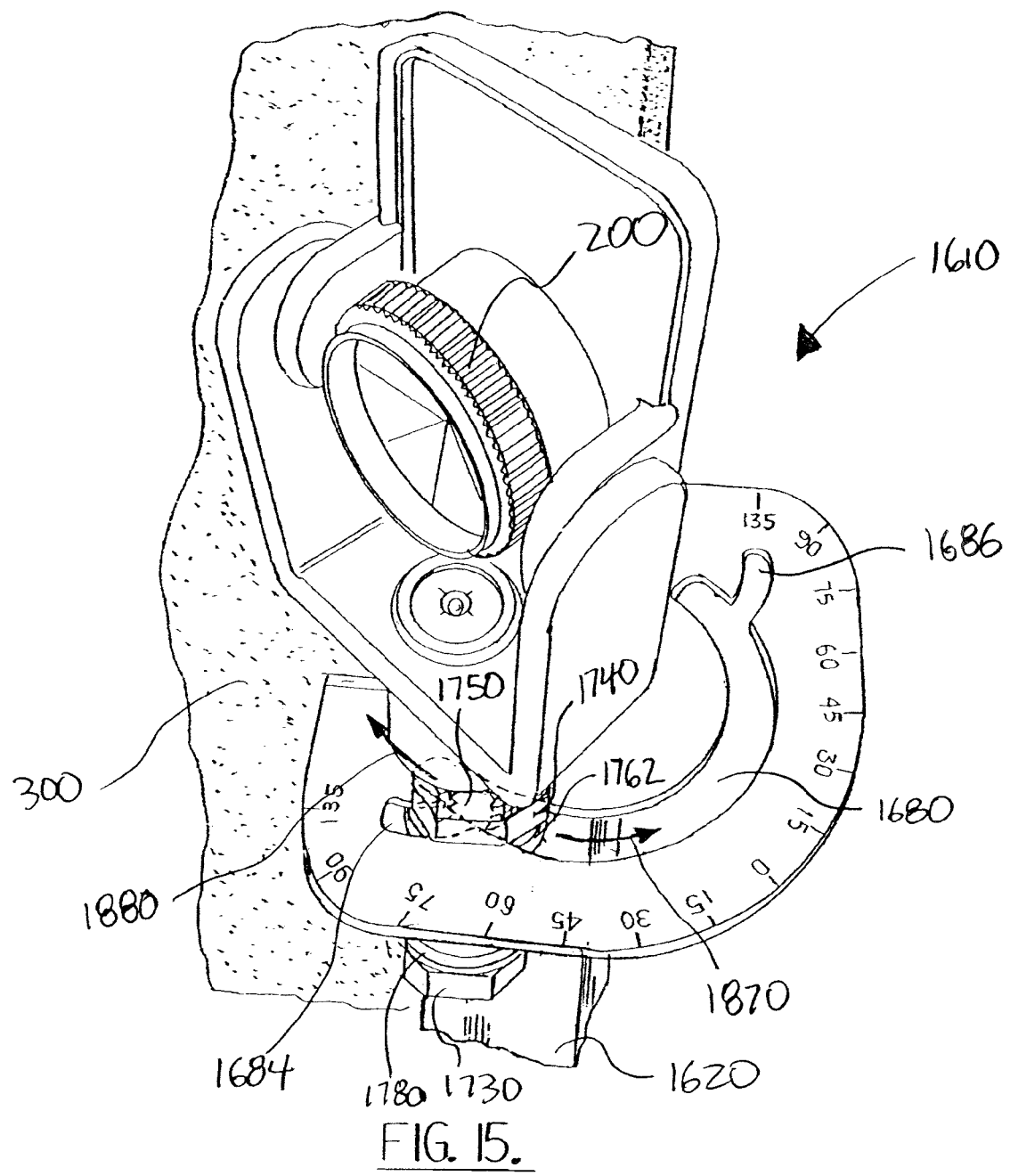
FIG. 15 is a perspective view of an alternative prism corner stand.
Figure 23:
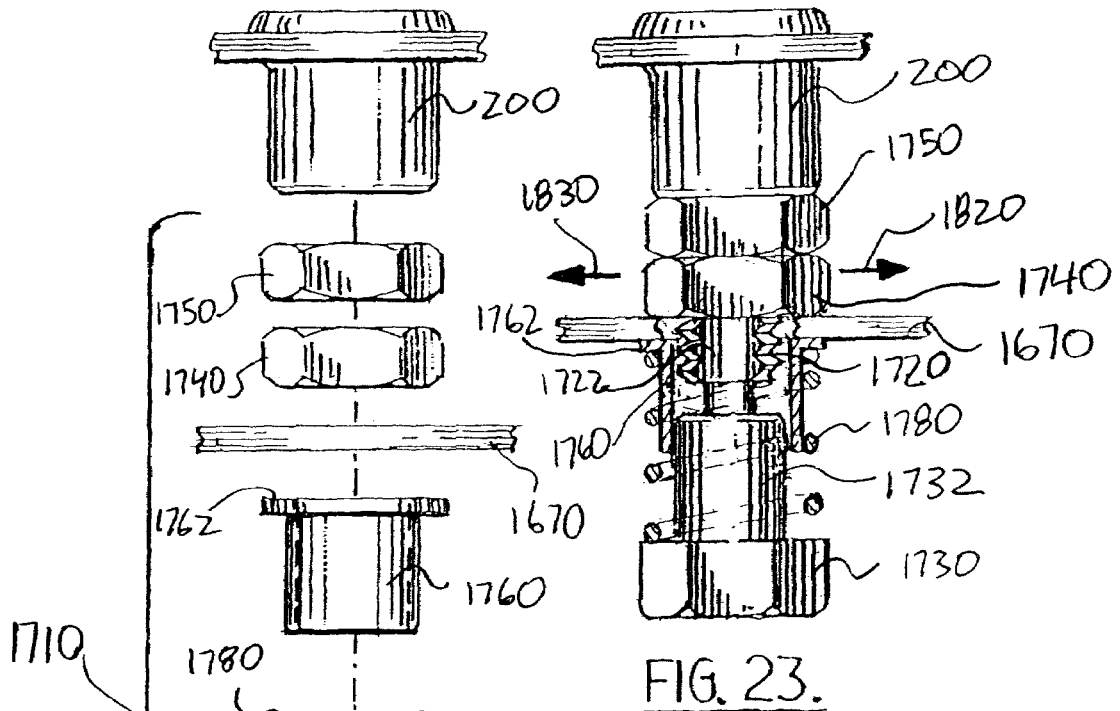
FIG. 23 is a partial sectional view of the quick release/quick lock frictional positioning system of FIG. 21 schematically indicating translational movement.
Figures 22, 24:
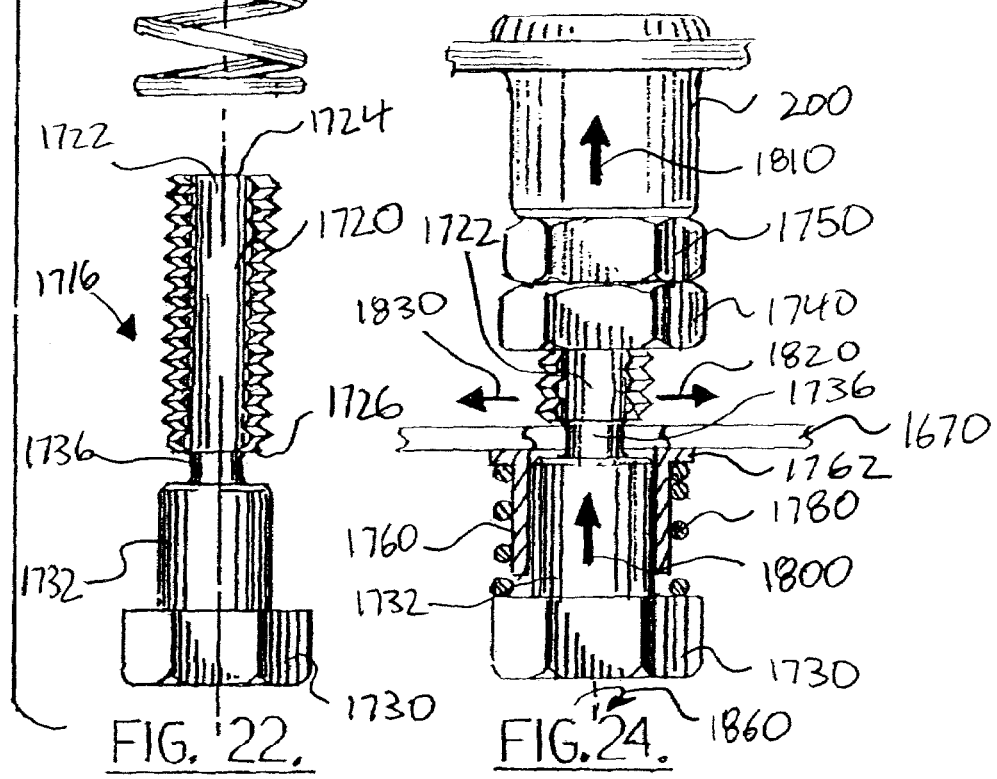
FIG. 22 is an exploded view of the quick release/quick lock frictional positioning system of FIG. 21.
FIG. 24 is a partial sectional view of the quick release/quick lock frictional positioning system of FIG. 21 schematically indicating movement from the center slot to one of the extended measuring slots/tracks.
Figure 25:
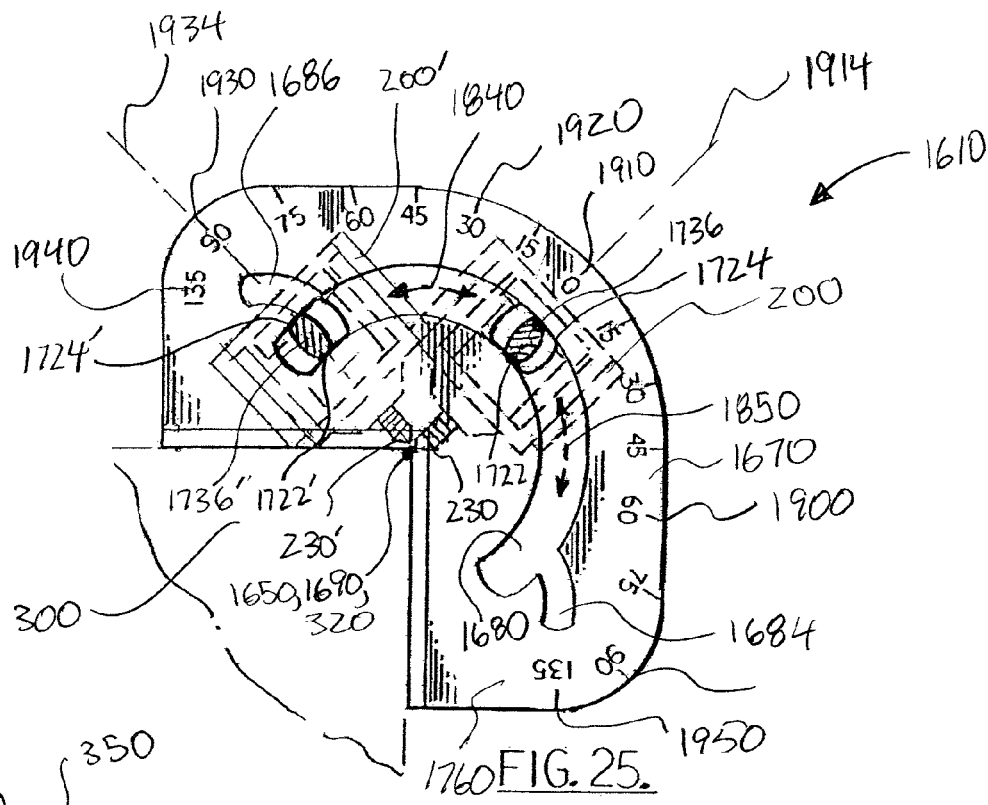
FIG. 25 is a top view of the alternative prism corner stand of FIG. 15 showing two positions in the center slot.
Figure 26:
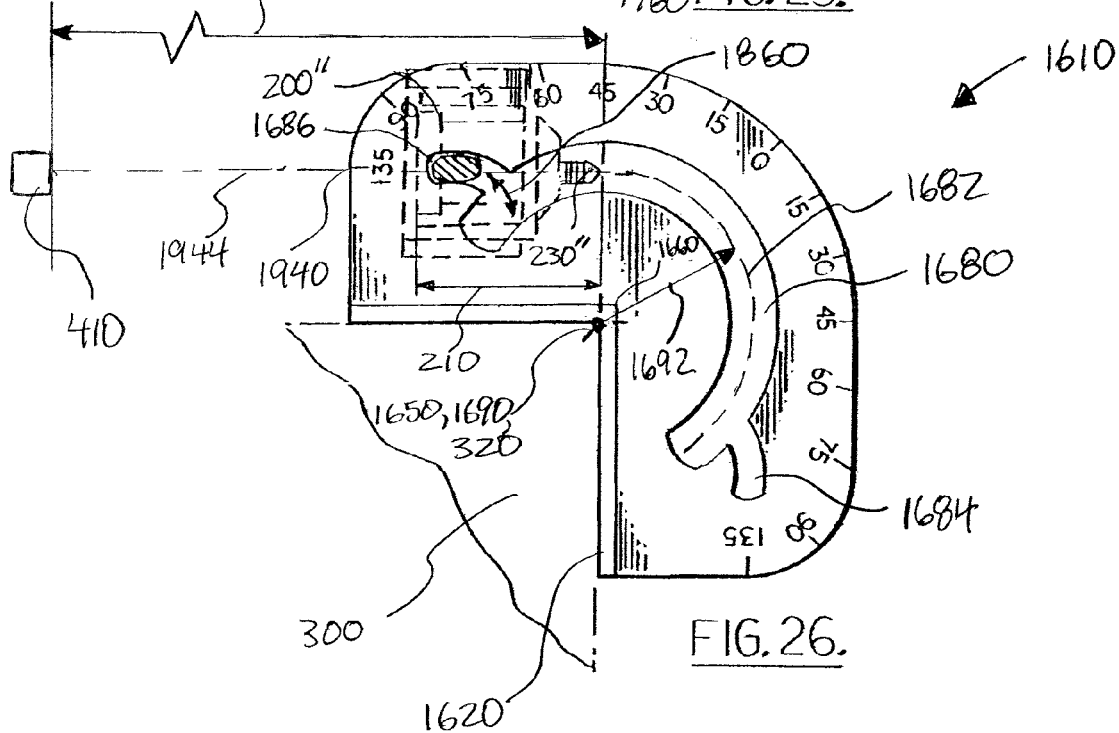
FIG. 26 is a top view of the alternative prism corner stand of FIG. 15 showing the prism being positioned in on of the extended measuring slots/tracks.

FIG. 15 is a perspective view of an alternative prism corner stand 1610. FIG. 16 is a front view of a threaded locking bolt 1716 which can be used in one embodiment. FIG. 17 is a side view of bolt 1716. FIG. 18 is a sectional view of bolt 1716 taken along the lines 18-18. FIG. 19 is a sectional view of bolt 1716 taken along the lines 19-19. FIG. 20 is a sectional view of bolt 1716 taken along the lines 20-20. FIG. 21 is an assembled view of a quick release/quick lock frictional positioning system 1710. FIG. 22 is an exploded view of quick release/quick lock frictional positioning system 1710. FIG. 23 is a partial sectional view of quick release/quick lock frictional positioning system 1710 schematically indicating translational movement. FIG. 24 is a partial sectional view of quick release/quick lock frictional positioning system 1710 schematically indicating movement from center slot 1680 to one of the extended measuring slots/tracks 1684 or 1686. FIG. 25 is a top view of the alternative prism corner stand 1610 showing two positions in center slot 1680. FIG. 26 is a top view of the alternative prism corner stand 1610 showing prism 200 being positioned in one of the extended measuring slots/tracks 1684 or 1686.

In other embodiments (shown in FIGS. 15 through 26) a prism corner stand 1610 has the ability to accommodate large angle measurements, such as a shot taken at 135 degrees from a corner along with two degrees of freedom: (a) rotation about prism support 1670 and (b) translational movement through semicircular slot 1680. Additionally, and optional quick release frictional locking system is disclosed in these figures (which can be used in any embodiment disclosed in this application). Furthermore, an optional measuring indicia printout is used to assist in positioning (or measuring the relative position of) prism 200 with respect to stand 1610.

The individual components of alternative prism corner stand 1610 will now be described. Prism corner stand 1610 can comprise angle 1620, prism support 1670, and adjustment means 1710. Angle 1620 can comprise side 1622, side 1624, top 1630, bottom 1640, inside corner 1650, and outside corner 1660. Prism support 1670 and adjustment means 1710 can be used to selective adjust both the position and vertical rotation of prism 200.

Prism support 1670 can be attached to angle 1620 by any convenient means, such as fasteners, adhesives, magnets, welding, etc. Preferably prism support 1670 can be substantially perpendicular to both faces (1622 and 1624) of angle 1620. As best shown in FIGS. 15, 25, and 26, prism support 1670 can include semicircular radial slot 1680, which has a radius of curvature 1692, measured from inside corner 1650 of angle 1620 to the center 1682 of slot 1680. In this manner regardless of the translational position of prism 200 on slot 1680 (as schematically indicated by arrows 1870), prism 200 will be a fixed distance from inside corner 1650. FIG. 25 shows two translational positions 1700,1702 around slot 1680. Prism 200 can also be rotatively adjusted relative to support 1670. These translational and rotational adjustments can be accomplished through adjustment means 1710.

As shown in FIGS. 16-24, adjustment means 1710 can comprise threaded stem 1720, head 1730, nut 1740, nut 1750, sleeve member 1760, and biasing member 1780. Additionally, head 1730 can include an enlarged area 1732 and reduced area 1736.

Nut 1740 can be used to frictionally lock stem 1720 at a specific translational location in slot 1680, such as by tightening nut 1740 at a selected location. Tightening nut 1740 compresses biasing member 1780 which pushes sleeve member 1760 against support 1670 thereby frictionally locking prism 200 to prism support 1670 between nut 1740 and sleeve member 1760. To move prism 200 head 1730 can be pushed in the direction of arrow 1800 causing nut 1740 to move in the direction of arrow 1810 and allowing prism 200 to be moved in the direction of arrow 1820 or 1830. The compression of biasing member 1780 can be such that prism 200 can be moved in the direction of arrow 1820 or 1830 without having to move head 1730 in the direction of arrow 1800 (e.g., moving in the direction of arrow 1800 by pushing on head 1730). Instead, adjustable means 1710 can be moved in the direction of arrows 1840 or arrows 1850 to a selected position. Nut 1740, bolt 1716, and base 1760 will slide through slot 1680 if the frictional forces between these members and support 1670 are overcome such as when a sideways force is applied in the direction of arrow 1820 or 1830 (see FIGS. 23, 25, and 26). Using a sideways force prism 200 can be adjusted to a selected position along slot 1680.

Because prism 200 can also be mounted on stem 1720 prism 200 can also be positioned (both translationally and rotationally) with stem 1720. Nut 1750 can serve as a lock nut which frictionally engages the base of prism 200 and/or nut 1740.

As shown best in FIGS. 15, 25, and 26 slot 1680 can made so that pointer 230 of prism 200 will line up with inside corner 1650 of angle 1620 of stand 1610 (and have its center of rotation 1690 for slot 1680 at this point). In this way, regardless of the position in slot 1680, prism 200 will provide a measurement from inside corner 1650 which is placed in contact with outside corner point 320 of building 300 to be measured and provide an accurate measurement without correction for the thickness of angle 1620. However, if a measurement of an inside corner of a building 300 is to be taken, then a correction for the thickness of angle 1620 can be made. Alternatively, the center of rotation 1690 for slot 1680 can be made at some other point (e.g., (a) at the outside corner 1660 of angle 1620 or (b) at the midpoint between the outside corner 1660 and inside corner 1650 of angle 1620) some distance X from the point to be measured as long as a correction for the some distance X is made.

Threaded stem 1720 can include cross sectional areas 1722, 1724 in the threaded area. Cross sectional area 1722 can be concave to assist in traversing through the inner portion of slot 1680. Cross sectional area 1724 can be convex to assist in traversing through the outermost portion of slot 1680. By making areas 1722 and 1724 respectively concave and convex, a fairly accurate radial position from the center point of slot 1680 (e.g., corner 1650) when threaded stem 1720 is being moved. Additionally, the shaping of areas 1722 and 1724 allow for controlled rotation of prism 200 when prism 200 is moved along slot 1680. Preferably, the centerline through threaded stem 1720 will be tangent to a circle formed by the centerline 1682 of slot 1680.

As best shown in FIGS. 15, 21, 23, and 25, once prism 200 is adjusted for any one position in slot 1680 (e.g., pointing in a direction perpendicular to the tangent of centerline 1682 of slot 1680 or parallel to the particular marked indicia 1900 at which prism 200 is set), subsequent movement of threaded stem (and prism 200 connected to threaded stem 200) will see prism 200 tangent to centerline 1682 of slot 1680. In FIG. 15 prism 200 is shown pointing in a direction parallel to the line for the 90 degree marked indicia. If prism 200 is moved in the direction of arrow 1870 to, for example, the 30 degree marked indicia, by movement of adjusting means 1710, prism 200 will be pointing in a direction parallel to the line for the 30 degree marked indicia. Prism 200 is automatically pointed parallel by the movement of threaded stem 1720 in slot 1680, and the user does not have to rotate prism 200 independent of the prism's rotation caused by movement of stem 1720. However, if desired the user can rotatively adjust prism 200 relative to threaded stem 1720 (such as by loosening nut 1750) to point prism 200 in a different direction (e.g., different than perpendicular to a line tangent to the centerline 1682 of slot 1680).

With alternative prism stand 1610, a greater degree of translational movement (and positioning) can be achieved through alternative slots 1684, 1686. In one embodiment, support 1670 can include one or two large angular position tracks/slots 1684 and 1686. Such large-position tracks can allow prism 200 to be positioned about parallel to one or the other wall of building 300. Preferably, the tracks would be structured such that pointer 230 of prism 200 would line up with corner point 1650 (or corner 320) for measuring a distance to this corner. As described with prism stand 20 the distance 210 can be used in calculating the distance 350 to be measured measuring device 410. As shown in FIG. 24, to move from slot 1680 to slot/tracks 1684 or 1686, head 1730 is pushed in the direction of arrow 1800 until reduced area section 1736 rises to the level of slot 1680. At this point head 1730 can be turned in the direction of arrow 1860 to allow movement from slot 1680 to track/slot 1684 or 1686 as desired. Once moved over to the appropriate slot/track, head 1730 can be allowed to move down in the opposite direction of arrow 1800 so that the bottom 1726 of threaded section of stem 1720 can rest on the top of the selected track/slot. The shape, size, and configuration of the selected slot/track can be configured relative to the bottom 1726 (or cross section of the stem) of threaded section of stem 1720 to properly position prism 200 for the selected measurement (e.g., have pointer 230" as shown in FIG. 26 when measuring distance 350 to corner 1650, 320). Similarly, slot/track 1684 can be shaped, sized, and configured when taking a measurement from for mark 1950.

Slots 1684, 1686 allow prism to measure a greater angular position relative to the "0" degree mark 1910. One hundred thirty five degrees is marked for track 1686 (and also for track 1684). Working out the angles for the "0" degree mark 1910 means that position 1940 is parallel to one wall of building 300 while position 1950 is parallel to the second wall of building 300 (these positions are respectively parallel to their walls of channel 1620).

In one embodiment, support 1670 (or support 70) can include a plurality of indicia 1900 to indicate the relative angular position of a specific translational setting. For example, indicia 1910 is shown as being "0" which indicates a zero degree offset from a plane which bisects the two arms of channel 1620 (or channel 20). Plurality of indicia 1900 are shown in fifteen degree increments, but can be changed such a one, two, three, four, five, six, seven, eight, nine, ten, twenty, thirty, forty, forty five, etc. degrees. Alternatively, a plurality of marks can be included which indicate preferred positions. Alternatively, the indicia need not be symmetrically listed, but can include non-symmetric indications such as in favorite positions.

In FIG. 25 position 1930 is listed as being at ninety degrees—this is when prism 200 is in slot 1680—and dashed line 1934 indicates the distance/direction to a point being measured (although the point is not shown). Similarly, dashed line 1914 indicates the distance/direction to a point being measured (although the point is not shown).

The following is a list of reference numerals:

| LIST FOR REFERENCE NUMERALS | |
|---|---|
| (Reference No.) | (Description) |
| 5 | ground |
| 10 | prism stand |
| 20 | channel |
| 22 | overall height |
| 30 | top |
| 40 | bottom |
| 50 | inside corner |
| 60 | outside corner |
| 70 | prism support |
| 80 | slot |
| 82 | centerline of slot |
| 90 | center of rotation |
| 92 | radius of curvature |
| 100 | first position |
| 102 | second position |
| 104 | third position |
| 106 | fourth position |
| 110 | adjustment means |
| 120 | stem |
| 130 | head |
| 140 | nut |
| 150 | nut |
| 160 | washer |
| 170 | arrows |
| 180 | arrow |
| 200 | prism |
| 202 | base of prism |
| 210 | offset |
| 220 | distance from prism to center of rotation (or corner) |
| 230 | pointer |
| 300 | building |
| 310 | outside corner |
| 320 | outside corner point |
| 350 | distance |
| 360 | height |
| 400 | surveyor |
| 410 | electronic distance measuring device |
| 1000 | prism stand |
| 1020 | angle |
| 1022 | inside corner of angle |
| 1024 | outside corner of angle |
| 1026 | mid-point between outside and inside corners |
| 1030 | top |
| 1032 | first side |
| 1034 | second side |
| 1040 | bottom |
| 1070 | prism support |
| 1080 | lower base |
| 1090 | upper base |
| 1091 | enlarged area |
| 1092 | cavity |
| 1094 | bore |
| 1100 | bolt |
| 1102 | enlarged area or shank |
| 1110 | head |
| 1120 | nut |
| 1122 | biasing member (e.g., spring, boot, or biasing material) |
| 1126 | arrow |
| 1130 | washer |
| 1140 | screw |
| 1142 | screw |
| 1200 | center of rotation |
| 1300 | adjustment means (which can be an adjustment bracket) |
| 1310 | base |
| 1311 | bottom of base |
| 1312 | base |
| 1313 | bottom of base |
| 1320 | sleeve |
| 1330 | anchoring means |
| 1340 | anchoring means |

-continued

| LIST FOR REFERENCE NUMERALS | |
|---|---|
| (Reference No.) | (Description) |
| 1350 | arrows |
| 1360 | arrow |
| 1370 | first position |
| 1372 | second position |
| 1374 | third position |
| 1376 | fourth position |
| 1378 | fifth position |
| 1400 | height of prism from bottom of base of adjustment means |
| 1500 | building |
| 1510 | outside corner |
| 1520 | inside corner |
| 1610 | prism stand |
| 1620 | channel |
| 1650 | inside corner |
| 1660 | outside corner |
| 1670 | prism support |
| 1680 | slot |
| 1682 | centerline of slot |
| 1684 | large angle slot or track |
| 1686 | large angle slot or track |
| 1690 | center of rotation |
| 1692 | radius of curvature |
| 1710 | adjustment means |
| 1716 | adjustment bolt |
| 1720 | stem |
| 1722 | area of reduced cross section (e.g., concave) |
| 1724 | area of reduced cross section (e.g., convex) |
| 1726 | bottom of stem/threaded area |
| 1730 | head |
| 1732 | enlarged area or shank |
| 1736 | reduced area |
| 1740 | nut |
| 1750 | nut |
| 1760 | sleeve member |
| 1762 | base of sleeve member (with enlarged annular area) |
| 1780 | biasing member (e.g., spring, boot, or biasing material) |
| 1800 | arrow |
| 1810 | arrow |
| 1820 | arrow |
| 1830 | arrow |
| 1840 | arrows |
| 1850 | arrows |
| 1860 | arrows |
| 1870 | arrow |
| 1880 | arrow |
| 1900 | plurality of measuring indicia or marks |
| 1910 | measuring indicia or mark |
| 1914 | dashed line |
| 1930 | position |
| 1934 | dashed line |
| 1940 | position |
| 1944 | dashed line |
| 1950 | position |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

What is claimed is:

1. A method of adjusting a surveying prism comprising the steps of:
   (a) providing an adjustable prism corner stand, the stand comprising (i) a base for placement on a corner surface, the base including first and second sections, the first section intersecting substantially at a right angle with the second section; the intersection of the first section forming inside and outside corners; (ii) an adjustment member that includes a plate having first and second edges that form a right angle and an adjustment track, the plate being connected to the first and second sections of the base at the first and second edges of the plate; wherein the adjustment track is spaced radially away from the said edges, the adjustment track having a radius of curvature which is remains substantially constant for at least a thirty degree angular turn; and (iii) a prism connection, the prism connection being movable within the adjustment track, the prism connection being attachable to a prism;
   (b) connecting a prism to the prism connection provided in step "a";
   (c) placing the stand on a corner next to a reference point wherein said plate edges conform to said corner surface; and
   (d) adjusting the prism connection on the adjustment track, enabling the prism to face a distance measuring device.

2. The method of adjusting a surveying prism of claim 1, wherein in step "c" the prism connection is moved both rotationally and translationally in the adjustment track.

3. A method of adjusting a surveying prism comprising the steps of:
   (a) providing an adjustable prism corner stand, the stand comprising (i) a base for placement on a corner surface, the base including first and second sections, the first section intersecting substantially at a right angle with the second section; the intersection of the first section forming inside and outside corners; (ii) an adjustment member that includes a plate having a track, the adjustments member being connected to the base at the first and second sections with first and second edges of the plate that form a right angle; the adjustment member having an adjustment track adjacent to track, wherein the track is spaced radially away from the said edges, the track having a radius of curvature which is remains substantially constant for at least a thirty degree angular turn; and (iii) a prism connection, the prism connection being movable within the adjustment track, the prism connection being attachable to a prism;
   (b) connecting a prism to the prism connection provided in step "a";
   (c) placing the stand on a corner next to a reference point wherein said edges conform to said corner surface and adjusting the prism connection on the adjustment track, enabling so that the prism is facing to face a distance measuring device;
   (d) wherein in step "a," the adjustment track includes at least one wide angle slot which does not follow the radius of curvature of the track.

4. The method of adjusting a surveying prism of claim 1, wherein in step "a," the adjustment member frictionally locks to the base, but can frictionally slide from a first position to a second position.

5. The method of adjusting a surveying prism of claim 4, wherein in step "a," wherein the adjustment member includes a quick release which can substantially reduce the frictional force applied by the adjustment member to the base through operation of the quick release.

6. The method of adjusting a surveying prism of claim 1, wherein in step "a," translational movement of the adjustment member along the track also causes rotational movement of the adjustment member.

* * * * *